US009352519B2

(12) United States Patent
Frank et al.

(10) Patent No.: US 9,352,519 B2
(45) Date of Patent: May 31, 2016

(54) METHOD FOR MANUFACTURING A LINING ELEMENT, A LINING ELEMENT AND A VEHICLE (71) Applicant: Airbus Operations Gmbh, Hamburg (DE)

(72) Inventors: Stefan Frank, Hamburg (DE); Tina Joern, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 36 days.

(21) Appl. No.: 13/895,425

(22) Filed: May 16, 2013

(65) Prior Publication Data

US 2013/0309455 A1    Nov. 21, 2013

Related U.S. Application Data

(60) Provisional application No. 61/647,798, filed on May 16, 2012.

(30) Foreign Application Priority Data

May 16, 2012    (EP) ..................................... 12168294

(51) Int. Cl.
*B29C 70/88* (2006.01)
*B29C 70/76* (2006.01)
(Continued)

(52) U.S. Cl.
CPC ............. *B29C 70/887* (2013.01); *B29C 70/088* (2013.01); *B29C 70/747* (2013.01);
(Continued)

(58) Field of Classification Search
CPC ........ B32B 37/14; B32B 5/02; B29C 70/887; B29C 70/78; B29C 70/747; B29C 70/088; B29C 70/763; B29C 33/68; B29C 37/0075; B29C 70/76; B64C 1/006
See application file for complete search history.

(56) References Cited

U.S. PATENT DOCUMENTS 2,362,707 A * 11/1944 Malmquist ...................... 81/329
2,949,667 A *  8/1960 Cameron et al. ........... 228/173.6
(Continued)

FOREIGN PATENT DOCUMENTS

AT        505901 A4    5/2009
CN     101795852 A    8/2010
(Continued)

OTHER PUBLICATIONS

European Searching Authority, European Search Report for Application No. 121682942 Dated Oct. 26, 2012.
(Continued)

*Primary Examiner* — Matthew Daniels
(74) *Attorney, Agent, or Firm* — Ingrassia Fisher & Lorenz, P.C.

(57) ABSTRACT

A method for manufacturing a lining element is provided. The method comprises laying a textile membrane onto a positive molding tool, applying first fibers and a matrix material onto at least one first region of the textile membrane for creating a semi-finished product of a framework supported textile, providing at least one sealing element along outer edges of the molding tool, covering the textile membrane and the at least one sealing element in an air tight manner by a covering means, evacuating the space between the molding tool and the covering means and curing the matrix material by heating the semi-finished product. Thereby, a lining element with a low weight and at the same time a sufficient directional stability is provided that furthermore allows to easily recycle the components of the lining element.

7 Claims, 5 Drawing Sheets

(51) Int. Cl.
  *B29C 70/74*   (2006.01)
  *B29C 70/78*   (2006.01)
  *B29C 70/08*   (2006.01)
  *B64C 1/06*    (2006.01)
  *B32B 5/02*    (2006.01)
  *B32B 37/14*   (2006.01)
  *B29L 31/30*   (2006.01)
  *B29C 70/44*   (2006.01)

(52) U.S. Cl.
  CPC .............. *B29C 70/76* (2013.01); *B29C 70/763* (2013.01); *B29C 70/78* (2013.01); *B32B 5/02* (2013.01); *B32B 37/14* (2013.01); *B64C 1/066* (2013.01); *B29C 70/44* (2013.01); *B29L 2031/3011* (2013.01); *Y02T 50/433* (2013.01); *Y02T 50/46* (2013.01); *Y10T 428/24612* (2015.01)

(56) References Cited

U.S. PATENT DOCUMENTS

| | | | | | |
|---|---|---|---|---|---|
| 2,961,028 | A | * | 11/1960 | Bath | 72/297 |
| 3,034,560 | A | * | 5/1962 | Matthews | 72/297 |
| 3,314,269 | A | * | 4/1967 | Mackenzie | 72/296 |
| 3,711,934 | A | * | 1/1973 | Zorowski et al. | 29/445 |
| 4,065,340 | A | * | 12/1977 | Dickerson | 156/154 |
| 4,658,482 | A | * | 4/1987 | Lechner | 26/93 |
| 4,689,995 | A | * | 9/1987 | Turbe | 73/636 |
| 4,778,375 | A | * | 10/1988 | Mente | 425/388 |
| 5,106,568 | A | * | 4/1992 | Honka | 264/510 |
| 6,860,957 | B2 | * | 3/2005 | Sana et al. | 156/245 |
| 2007/0085237 | A1 | * | 4/2007 | Onishi | 264/272.11 |
| 2011/0024058 | A1 | | 2/2011 | Kernmayer et al. | |
| 2012/0175071 | A1 | | 7/2012 | Wuggetzer et al. | |

FOREIGN PATENT DOCUMENTS

| | | |
|---|---|---|
| CN | 102350803 A | 2/2012 |
| DE | 102009041597 A1 | 3/2011 |
| EP | 1977882 A1 | 10/2008 |

OTHER PUBLICATIONS

State Intellectual Property Office of the Peoples' Republic of China, Office Action for Chinese Patent Application No. 2015012601280930 mailed Jan. 29, 2015.

\* cited by examiner

METHOD FOR MANUFACTURING A LINING ELEMENT, A LINING ELEMENT AND A VEHICLE

CROSS-REFERENCE TO RELATED APPLICATIONS

This application claims priority to European Patent Application No. 12 168 294.2, filed May 16, 2012 and to U.S. Provisional Patent Application No. 61/647,798, filed on May 16, 2012, which are each incorporated herein by reference in their entirety.

TECHNICAL FIELD

The technical field relates to a method for manufacturing a lining element, a lining element and a vehicle comprising a cabin and at least one such lining element.

BACKGROUND

For the purpose of lining the interior of a vehicle cabin usually individual panels are used that, depending on their position in the installed state, may comprise different supporting means. For example, modern aircraft cabins usually comprise ceiling panels that are attached to overhead bins or to structural regions arranged above them. Furthermore, in the state of the art it is not uncommon for illumination devices to be arranged on each individual ceiling panel so that for individual modifications of the illumination concept by an aircraft operator ceiling panel may have to be modified.

WO 2011/032996 A1 discloses a cladding apparatus for an interior of an aircraft, comprising a two-dimensional fabric sheet, a guide device and a tensioning element, which tensioning element is configured to produce a tensile force that acts on the edges of the fabric sheet to stretch it along the direction of extension of the interior.

In addition, other objects, desirable features and characteristics will become apparent from the subsequent summary and detailed description, and the appended claims, taken in conjunction with the accompanying drawings and this background.

SUMMARY

Accordingly, there may exist a need for improving the manufacturing process of lining elements for vehicle cabins that lead to an accelerated integration into the cabin, the same or a lower weight of the lining elements compared to known lining elements and essentially the same translucent characteristics for the purpose of an illumination from above or behind the lining element through a translucent layer. Furthermore, the method for manufacturing a lining element should be as cost-effective as possible.

A method for manufacturing a lining element comprises laying a textile membrane onto a positive molding tool, applying first fibers and a matrix material onto at least one first region of the textile membrane that defines the shape of the lining element for creating a semi-finished product, providing at least one sealing element along outer edges of the molding tool, covering the textile membrane and the at least one sealing element in an air tight manner by a covering means, evacuating the space between the molding tool and the covering means and curing the matrix material of the semi-finished product.

This method according to the present disclosure clearly differs from all known manufacturing methods for lining elements. The positive molding tool comprises, different than negative molding tools, the actual visible shape of the lining element to be manufactured. This means, that an outer surface of the molding tool delimits the outer surface of the lining element that is laid upon the molding tool. For creating a smooth surface of the lining the outer surface of the molding tool has to be finished in an appropriate manner. The outer surface may comprise indentations and protrusions for providing differently shaped delimiting surfaces of the lining element to be manufactured.

After laying the textile membrane onto the outer surface of the molding tool it adapts the respective shape and, thereafter, is equipped by supporting elements, i.e. frame elements, for maintaining the desired shape through applying the first fibers and the matrix material onto the textile membrane. Applying the first fibers and the matrix material may be realized by laying pre-impregnated fiber bundles onto the textile membrane or subsequently laying first fibers and add a matrix material in a plurality of layers. Thereby, the matrix material comprises resin and the fibers may comprise glass fibers, carbon fibers, kevlar fibers or any other fibers that may be used for manufacturing a fiber reinforced material.

After curing the matrix material, i.e. the resin, in this arrangement, the lining element comprises an integral compound of the textile membrane and fiber reinforced components that act as frame elements and define the actual shape of the lining element. As the visible surface of the lining element in its installed state is facing the outer surface of the molding tool the fiber reinforced components are not visible from the desired viewing direction.

For providing a minimum arrangement of fiber reinforced components at least one first region, e.g. an outer edge of the lining element, shall comprise fiber reinforced components that is able to delimit or define the shape of the lining element to be manufactured. This further allows to support the lining element in a cabin by means of supporting holes, flanges or other fastening or supporting means. Alternatively, the lining element may also be clamped between two recesses, rails or hook structures. Due to the use of a textile membrane which may be rather thin and elastic, support of the lining element may be provided at at least one outer edge.

For providing an efficient curing process and therefore a precisely defined shape it is advantageous to cover the textile membrane and the at least one sealing element in an air tight manner by a covering means. Thereby, any holes or passages that prevent an optimal evacuation are prevented. Generally, the sealing element comprises an elastic material, e.g. a plastic foam material, cork or other common material. The covering means may comprise an elastic foil that easily adapts is shape conforming the shape of the semi-finished product. Additionally, a soft and porous mat may be introduced between the semi-finished product and the covering means for smoothening the pressure of the covering means onto the semi-finished product.

The semi-finished product may be cured in an autoclave oven where it is heated and subjected to an elevated pressure. Alternatively, the resin contents may cure at room temperature and ambient pressure. Thereby, the fiber reinforced components for defining the shape and supporting the lining element are created. Thereafter, the covering means can be removed and the edges of the lining element can be finished, as the lining element is now self-supporting.

In this method, the textile membrane shall be adapted for easily bonding to the resin of the fiber reinforced components. At the same time, the material of the textile membrane shall prevent the absorption of resin. Thereby the components may easily be separated after the life time of the lining element has ended. A textile made of fluor polymer compositions may be able to meet these requirements.

Generally, a common resin is used for creating the fiber reinforced components, such as melamin. In case the cabin lining element is intended for the use in aircraft cabins the resin may need to meet several requirements given for materials for aviation applications. For example, due to the advantageous fire protection qualities, such as fire risk and burn through, phenolic resins may be preferred.

In one exemplary embodiment, the at least one first region is positioned on the textile membrane such that the first fibers constitute at least one outer edge of the lining element. As explained above, shape supporting frame elements result. In another exemplary embodiment the first fibers are layed onto all outer edges of the textile membrane. Thereby, a fully circumferential frame work is produced that spans over all contour defining elements for delivering an optimal support.

In an exemplary embodiment the textile membrane is pre-tensioned before applying the first fibers onto the textile membrane. Pre-tensioning means that the textile membrane is tensioned on the positive molding tool such that it lies tightly on the molding tool. Thereby, shape deviations resulting from partially flabby or lose textile membrane can be avoided. Furthermore, the shape or contour accuracy can be clearly improved.

In another exemplary embodiment the textile membrane is pre-tensioned by means of a pulling lever mechanism on at least one outer edge of the molding tool. Such a lever mechanism may be provided at one or two outer edges of the positive molding tool. This allows laying the textile membrane onto the molding tool and afterwards moving levers of the lever mechanism from a first position to a second position, during which motion the textile membrane is tensioned. In an exemplary embodiment, the levers of the lever mechanisms are bi-stable such that they may be brought into a first position and a second position, wherein the levers are fully maintaining their adjusted positions on their own. Alternatively, e.g. by means of a ratchet mechanism, the levers may be prevented from moving back and untensioning the textile membrane.

In another exemplary embodiment the tensioning force applied onto the textile membrane by the pulling lever mechanism is a linear tensile force introduced along substantially the complete extension of the textile membrane at the at least one outer edge. The textile membrane is thereby only tensioned along its extension plane at the outer edges.

In another exemplary embodiment second fibers and a matrix material are applied onto second regions of the textile membrane for creating stiffening elements. As explained above, in a first step only outer edges or other contour defining first regions may be provided with a fiber reinforced frame structure. The remainder of the textile membrane may afterwards be equipped with stiffening elements that are supporting the three dimensional shape of the lining element.

In one exemplary embodiment, the second fibers are applied onto the textile member such that they extend to the first fibers. Thereby, bridges are created that extend e.g. from one outer edge to another outer edge for providing an optimal stabilization.

In another exemplary embodiment the second fibers overlap with the first fibers. Thereby, an optimal connection between the outer edges and the stiffening elements is provided.

The present disclosure further provides a lining element comprising a textile membrane and at least one frame element made of a fiber reinforced material comprising first fibers and a matrix material, wherein the first fibers are directly laminated onto the textile membrane in at least one first region. The at least one first region defines the contour of the lining element to be manufactured.

One exemplary embodiment comprises at least one stiffening element made of a fiber reinforced material comprising second fibers and a matrix material, wherein the second fibers are directly laminated onto the textile membrane in at least one second region.

In one embodiment the lining element comprises a plurality of stiffening elements with a defined distance to each other. By providing stiffening elements the structural integrity of the lining element is improved such that the lining element is predestined for equipping a vehicle cabin in the light of vibrations and motion forces that occur during the operation of the vehicle.

One exemplary textile membrane is translucent, supporting a lighting concept in the cabin that allows indirect light through the lining element.

Still further, the present disclosure provides a vehicle comprising at least one cabin having at least one lining element according to the preceding explanation.

The vehicle may comprise an illumination device positioned above the at least one lining element.

In one example, the vehicle is an aircraft where it is paramount to reduce the weight of any installation equipment. The lining element according to the present disclosure helps reducing the weight of lining element, e.g. a ceiling lining element.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
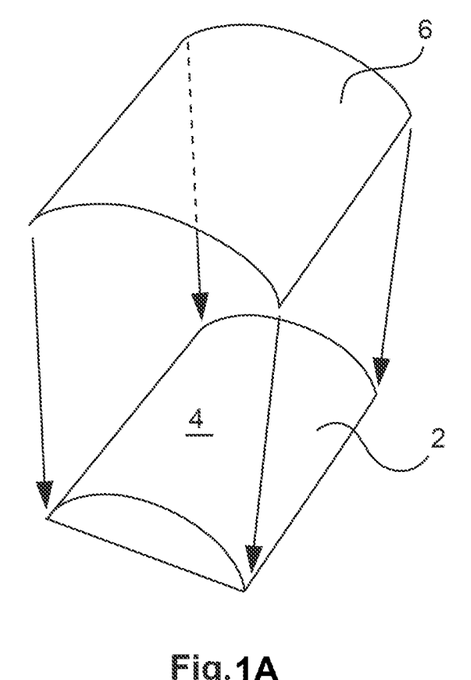
FIGS. 1A to 1G show a method for manufacturing a lining element according to one exemplary method.

FIG. 1A shows a first step A of an exemplary method according to the one exemplary embodiment of the present disclosure. A positive molding tool 2 is given, which tool 2 exemplarily has the shape of a cylindrical section that conforms a ceiling region of an aircraft cabin. The upper surface 4 of the molding tool 2 is responsible for the visible surface of the cabin lining element to be manufactured. Therefore, the finish of this surface 4 shall be taken care of. In a first step of the exemplary method according to the present disclosure a textile membrane 6 is laid onto the upper surface 4 of the molding tool 2 such that it conforms the shape of the upper surface 4. The less complex the shape of the molding tool 2 is, the easier the textile membrane 6 adapts to the desired shape.

The textile membrane 6 may comprise any suitable material for a vehicle cabin. The choice may depend on various requirements such as the desired texture, the ability to withstand the heat during the curing process at the end of the manufacturing method, any fire protection regulations, the elasticity, the expected weight of the lining element and the ability to prevent the absorption of resin. For example, a textile made of fluor polymer compositions may be able to meet these requirements.

Figure 1B:
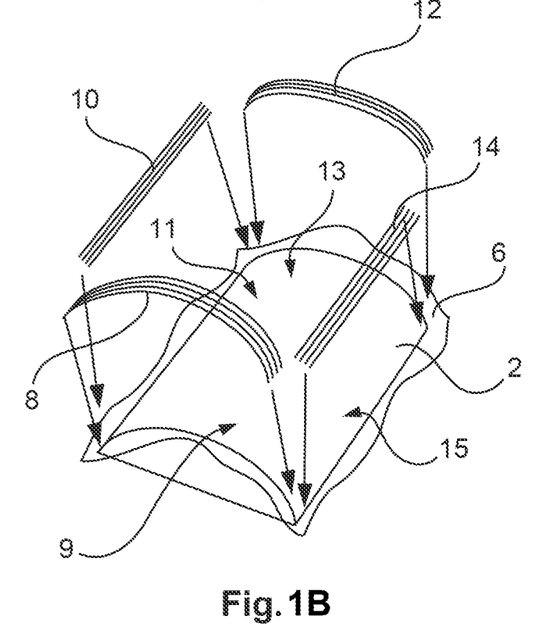

In a next step B, according to FIG. 1B, first fibers 8, 10, 12 and 14 are layed onto the textile membrane 6 on first surface regions 9, 11, 13 and 15 that are exemplarily chosen to be outer edges of the desired shape and outer edges of the molding tool 2, respectively. The first surface regions 9, 11, 13 and 15 shall be chosen such that a fiber reinforcement leads to a precise definition of cabin lining element contour by creating a framework that supports the flexible textile membrane 6. Besides outer edges it may also be possible to lay the first fibers 8, 10, 12 and 14 in a crossed manner over the textile membrane.

The first fibers 8, 10, 12 and 14 may be realized as pre-impregnated fiber bundles, i.e. fiber prepregs. Thereby the resin contained in the fiber bundles is precisely metered and it may largely be prevented that excess resin soils regions of the textile membrane 6 that shall be kept clear from resin and fibers. Furthermore, the manufacturing method may be easier and may be conducted in less time. As an alternative, also plain first fibers may be layed onto the textile membrane 6 onto which resin may be added, either once or subsequently after adding each layer of fibers.

Figure 1C:
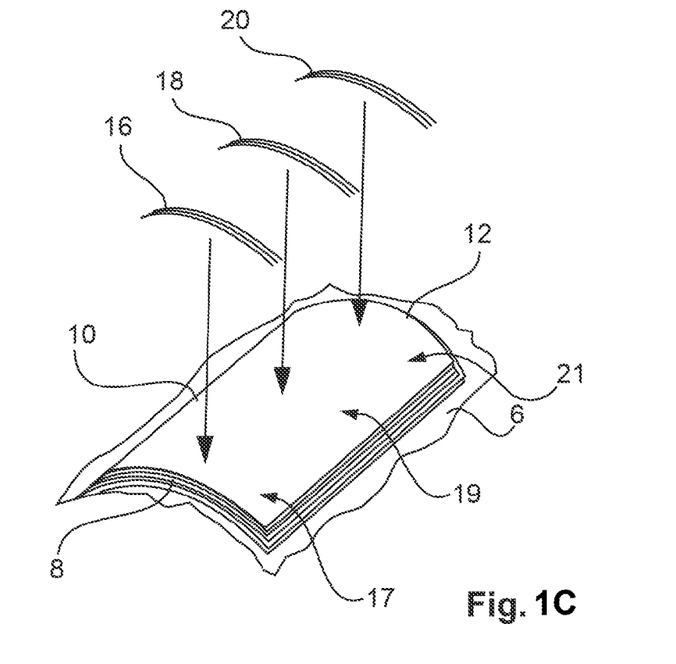

In a subsequent step C, see FIG. 1C, second fibers 16, 18 and 20 are layed onto second regions 17, 19 and 21 of the textile membrane 6 in order to create stiffening elements. For example, if first fibers 8, 10, 12 and 14 are exclusively positioned along outer edges of the molding tool 2 there may be a rather large region enclosed by the outer edges that is mainly unsupported. The desired shape of the cabin lining element may be given through the outer contours but under the influence of vibration and other motion forces the shape may be altered.

The second fibers 16, 18 and 20 may be positioned such that the span from one side of the cabin lining element to the other. This may exemplarily be conducted by laying the second fibers such that they span from the first fiber bundles 10 to the first fiber bundles 14. The second fibers 16, 18 and 20 may be positioned such that they overlap with the first fiber bundles 10 and 14 or, as an alternative, may just extend from one first fiber bundle 10 to the first fiber bundle 14 at the opposite side of the cabin lining element. This step leads to the creation of a semi-finished product.

Figure 1D:
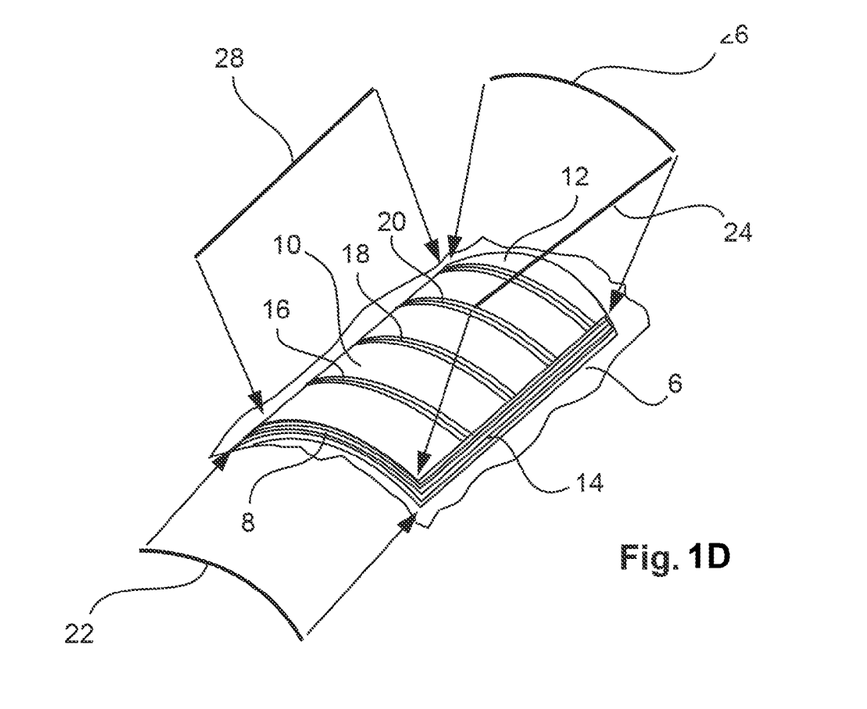

Subsequently, as shown with step D in FIG. 1D, sealing elements 22, 24, 26 and 28 are provided along outer edges of the molding tool 2 for sealing in an air tight manner. The sealing elements 22, 24, 26 and 28 may be an elastic material that may be pressed onto the surface of the textile membrane 6 in the direction of the molding tool 2.

Figure 1E:
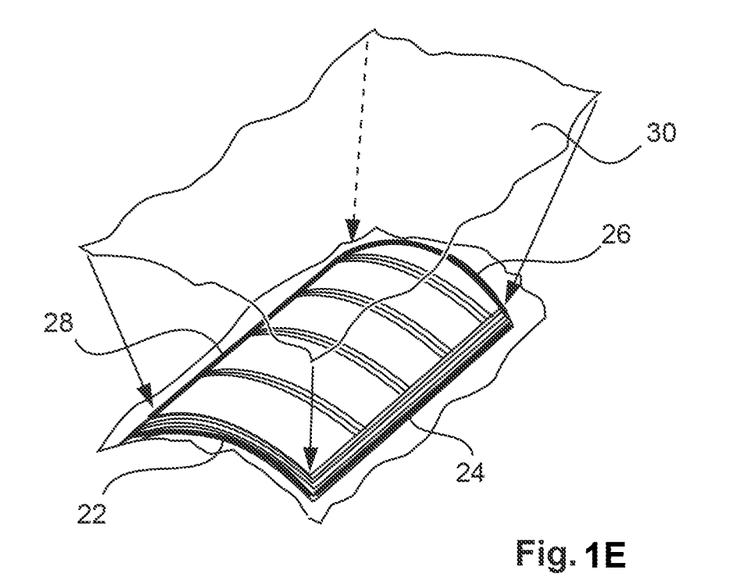

Furthermore, as shown with step E in FIG. 1E, a covering means 30 may be added. Additionally, in order to provide a smooth pressing force onto the semi-finished product, a porous flexible mat may be positioned between the semi-finished product and the covering means 30. These mats are available with various different linear mass densities and support to channel air during an evacuation process. For the ability to cure the cabin lining element in an autoclave oven under an elevated temperature a mat shall be chosen that is fire retardant.

Also, a wire mesh or wire bridged may additionally be positioned onto the semi-finished product in order to improve the force introduction during the evacuation process.

Figure 1F:
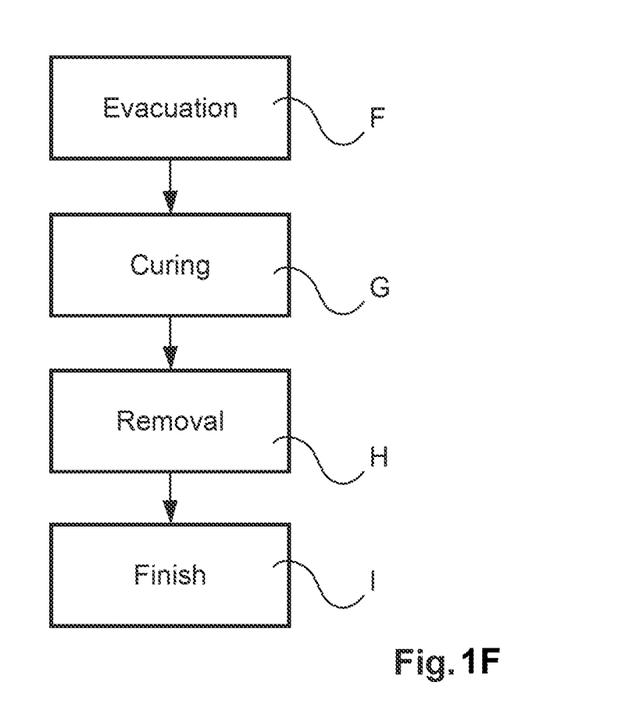

Thereafter, as indicated in FIG. 1F, the space between the covering means 30, the sealing elements 22, 24, 26 and 28 and the top surface of the textile membrane 6 and the first and second fibers is evacuated as step F. Afterwards, the semi-finished product is cured (step G), exemplarily in an autoclave oven at an elevated temperature. After removal of the covering means 30, the sealing elements 22, 24, 26 and 28 the cabin lining element may be taken off the molding tool 2 (removal, step H). As the textile membrane 6 may have an excess length for enabling a precise alignment on the molding tool 2 and preventing too short dimensions a finishing step I follows for preparing the cabin lining element for installation in the aircraft cabin.

Figure 1G:
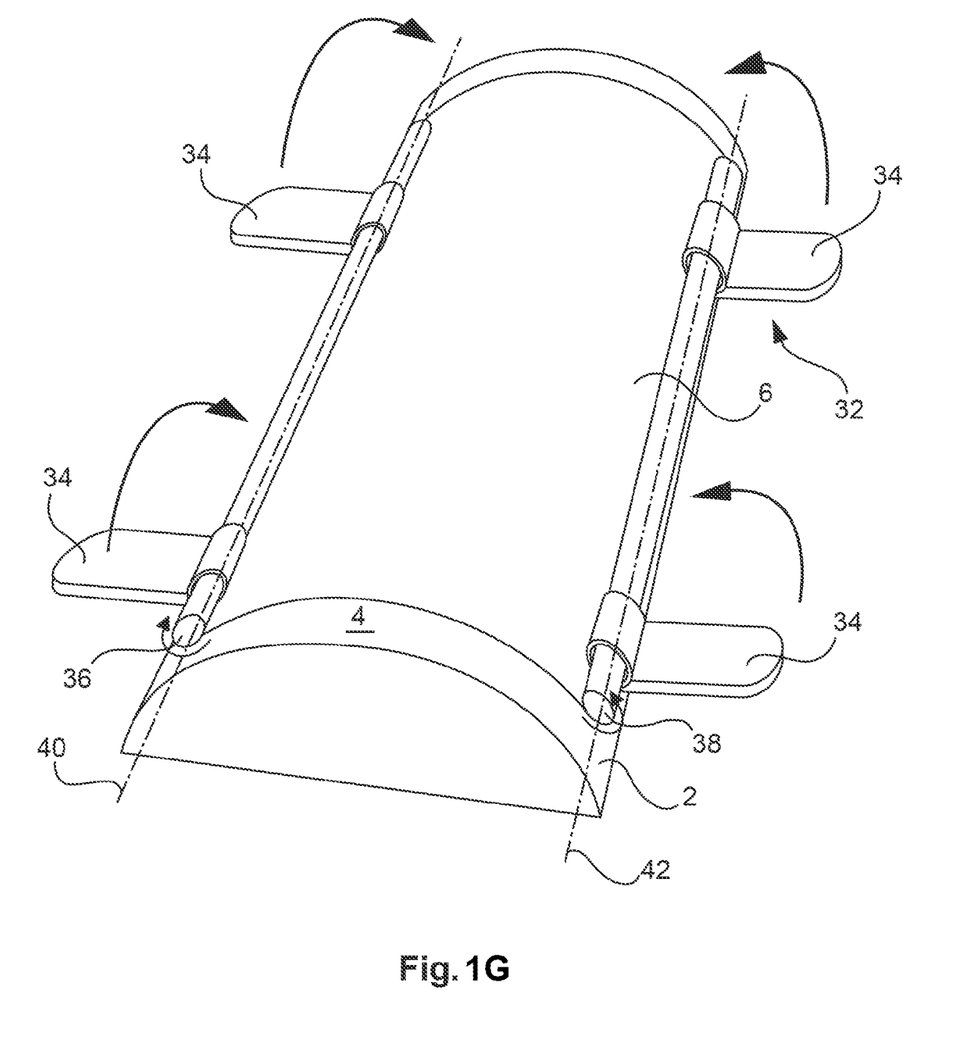

For providing an increased dimensional stability and precise spatial shape of the textile membrane 6 it may be tensioned before adding any fibers, i.e. between step A and step B as a step A', as shown in FIG. 1G. Here, the spatial dimensions of the molding tool 2 clearly exceed the desired dimensions of the cabin lining element for providing a lever mechanism 32 having levers 34 that act on end rolls 36 and 38 situated on opposite sides of the molding tool 2. The textile membrane 6 spans from the left end roll 36 to the right end roll 38 and thereby adapts its shape to the upper surface 4 of the molding tool 2. By moving the levers 34 as indicated by the arrows in FIG. 1G a tensioning force is applied to the textile membrane as the end rolls 36 and 38 both slightly rotate around rotational axes 40 and 42 extending substantially parallel to the outer edges of the molding tool 2 and thereby pull the textile membrane to the outer edges of the molding tool 2. Any tucks and folds in the textile membrane may thereby be prevented.

In order to maintain the tensioned shape the levers 34 may be realized as self arresting levers such that they may maintain their position, e.g. by means of a ratchet and clank connection or a bi-stable lever mechanism.

Figure 2:
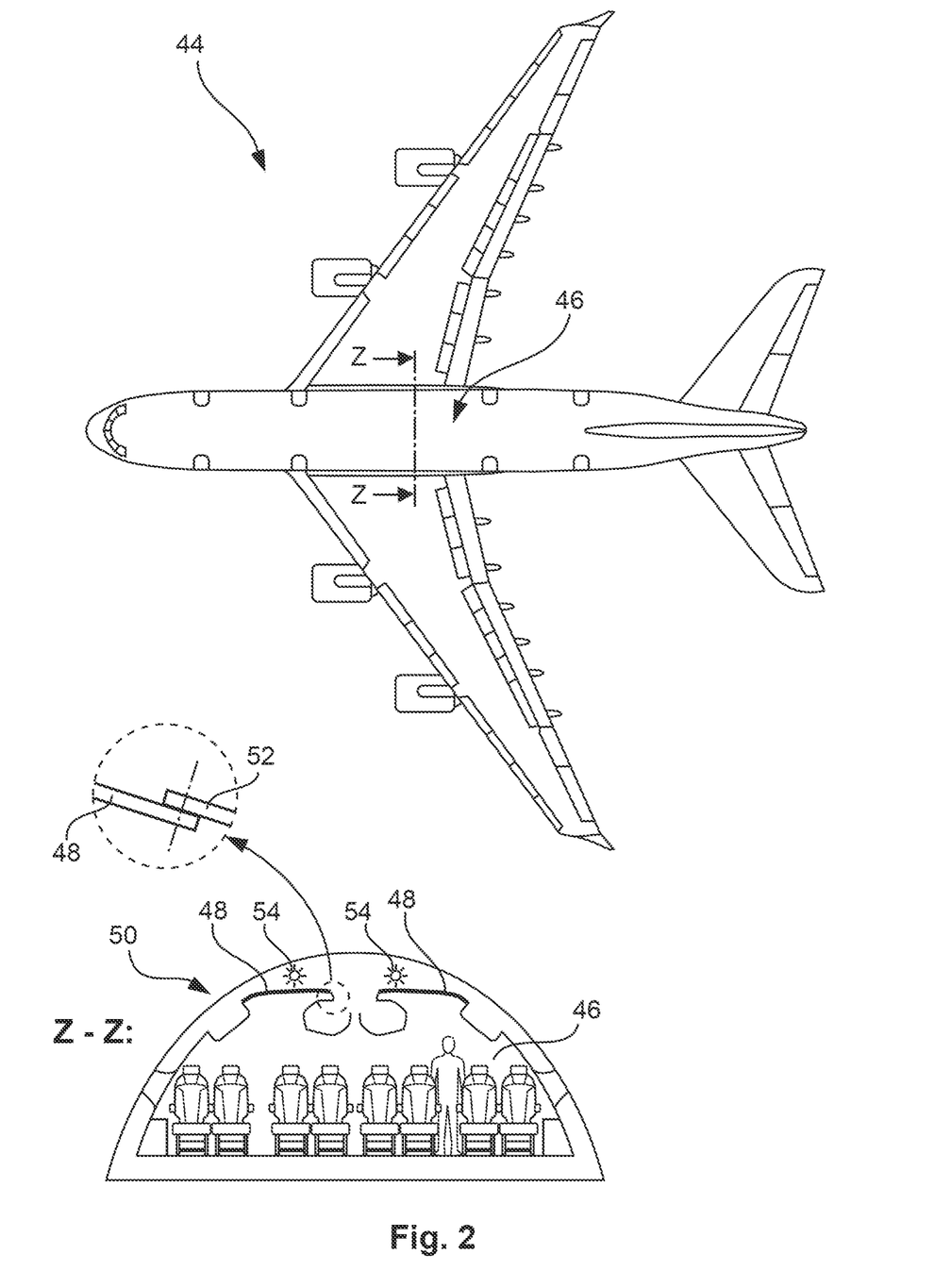
FIG. 2 shows an exemplary lining element in an aircraft.

FIG. 2 additionally shows an aircraft 44 with a cabin 46 that is cladded by means of various lining elements. A lining element 48 manufactured by the method as shown above, may be used for cladding a ceiling region 50 of the cabin 46. The cabin 46 may therefore comprise a plurality of holders 52 that are fixed to structural reinforcement parts of the fuselage. If the textile membrane 6 is translucent it may be feasible to position an illumination device 54 above the lining element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for manufacturing a lining element, comprising:
    laying an elastic textile membrane onto a positive molding tool;
    applying first fibers and a matrix material onto all outer edges the textile membrane such that a semi-finished product of a fully circumferential framework is created and configured as a support for the textile membrane, wherein textile membrane is pre-tensioned before the applying the first fibers onto the textile membrane;

providing at least one sealing element along outer edges of the molding tool;

covering the textile membrane and the at least one sealing element in an air tight manner by a covering means;

evacuating the space between the molding tool and the covering, means;

curing the matrix material by heating the semi finished product; and removing the lining element comprising an integral compound of the elastic textile membrane and cured fully circumferential framework from the positive molding tool, wherein the material of the textile membrane prevents the absorption of resin.

2. The method of claim 1, wherein the first fibers are positioned on the textile membrane in a first region such that the first fibers constitute at least one outer edge of the lining element to be manufactured.

3. The method of claim 2, wherein the textile membrane is pre-tensioned by means of a pulling lever mechanism on at least one outer edge of the molding tool.

4. The method of claim 3, wherein the tensioning force applied onto the textile membrane by the pulling lever mechanism is a linear tensile force along the substantially complete extension of the textile membrane at the at least one outer edge.

5. The method of claim 4, wherein second fibers and a matrix material are applied onto second regions of the textile membrane for creating stiffening elements.

6. The method of claim 5, wherein the second fibers are applied onto the textile membrane such that they extend to the first fibers.

7. The method of claim 6, wherein the second fibers overlap with the first fibers.

* * * * *